(12) United States Patent
Honda et al.

(10) Patent No.: US 7,429,227 B2
(45) Date of Patent: Sep. 30, 2008

(54) VEHICULAR DRIVING FORCE DISTRIBUTION DEVICE

(75) Inventors: Kenji Honda, Wako (JP); Yasuji Shibahata, Wako (JP); Jun Ohmura, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 272 days.

(21) Appl. No.: 11/480,566

(22) Filed: Jul. 5, 2006

(65) Prior Publication Data

US 2007/0021264 A1 Jan. 25, 2007

(30) Foreign Application Priority Data

Jul. 8, 2005 (JP) ............................. 2005-200526
May 15, 2006 (JP) ............................. 2006-135557

(51) Int. Cl.
*F16H 48/22* (2006.01)

(52) U.S. Cl. ...................... 475/204; 475/249; 475/284

(58) Field of Classification Search .................. 475/19, 475/199, 198, 222, 223
See application file for complete search history.

(56) References Cited

U.S. PATENT DOCUMENTS 5,692,987 A 12/1997 Shibahata et al.
6,120,407 A * 9/2000 Mimura ...................... 475/225
7,156,766 B2 1/2007 Gassmann

FOREIGN PATENT DOCUMENTS

| DE | 195 24 547 A1 | 1/1996 |
|---|---|---|
| DE | 103 29 770 A1 | 2/2005 |
| JP | 8-114255 A | 5/1996 |

* cited by examiner

*Primary Examiner*—Roger Pang
*Assistant Examiner*—Edwin A Young
(74) *Attorney, Agent, or Firm*—Westerman, Hattori, Daniels & Adrian, LLP.

(57) ABSTRACT

In a vehicular driving force distribution system, a left or right torque distribution clutch is selectively engaged to lock a carrier member or a sun gear of a planetary gear mechanism, whereby torque can be distributed between left and right wheels. Also, if a differential limitation clutch is engaged to control relative rotation of the sun gear and the carrier member of the planetary gear mechanism, the planetary gear mechanism enters a locked state, so that the left and right wheels are integrated to perform differential limitation. By the arrangement of merely providing the differential limitation clutch, the differential limitation can be performed by simple control and moreover the control response is improved, as compared with the case where differential limitation is performed by controlling engagement forces of the left and right torque distribution clutches.

2 Claims, 11 Drawing Sheets

VEHICULAR DRIVING FORCE DISTRIBUTION DEVICE

RELATED APPLICATION DATA

The Japanese priority application Nos. 2005-200526 and 2006-135557 upon which the present application is based are hereby incorporated in their entirety herein by reference.

BACKGROUND OF THE INVENTION

1. Field of the Invention

The present invention relates to a vehicular driving force distribution system comprising a torque distribution mechanism which includes a planetary gear mechanism and which is arranged between axles of left and right wheels, any two elements among three elements of the planetary gear mechanism being locked to a fixed portion via torque distribution clutches, respectively, so that torque is distributed between the axles of the left and right wheels.

2. Description of the Related Art

Such a vehicular driving force distribution system is disclosed in Japanese Patent Application Laid-open No. 8-114255. In this vehicular driving force distribution system, a torque transmission means comprising a planetary gear mechanism is provided between axles of right and left wheels, and torque is distributed between the right and left wheels by selectively restraining a sun gear or a carrier member of the planetary gear mechanism to forcibly control the rotational speed ratio between the right and left wheels.

If the differential of right and left axles is suppressed when a vehicle is running straight at a high speed, the straight line stability can be enhanced. Also in the vehicular driving force distribution system described in Japanese Patent Application Laid-open No. 8-114255, the right and left axles are integrated so as to be incapable of being relatively rotated by engaging a pair of clutches in a predetermined slip ratio, whereby the differential limitation function can be exerted. However, it is difficult to engage the paired clutches at the predetermined slip ratio with a high accuracy, and the control thereof is complicated to raise a problem of decreased response.

SUMMARY OF THE INVENTION

The present invention has been achieved in view of the above-mentioned circumstances, and has an object to provide a vehicular driving force distribution system for distributing torque between axles of right and left wheels, wherein differential limitation function is exerted by simple construction and control.

In order to achieve the above object, according to a first feature of the present invention, there is provided a vehicular driving force distribution system comprising a torque distribution mechanism which includes a planetary gear mechanism and which is arranged between axles of left and right wheels, any two elements among three elements of the planetary gear mechanism being locked to a fixed portion via torque distribution clutches, respectively, so that torque is distributed between the axles of the left and right wheels, wherein the system further comprises a differential limitation clutch for controlling relative rotation of the two elements among the three elements of the planetary gear mechanism.

A left clutch CL and a right clutch CR of embodiments correspond to the torque distribution clutches of the present invention, and a housing 20 of the embodiments corresponds to the fixed portion of the present invention.

Also, in the first feature, two elements of the planetary gear mechanism locked to the fixed portion by the torque distribution clutches may or may not coincide with two elements of the planetary gear mechanism whose relative rotation is controlled by the differential limitation clutch.

With the arrangement of the first feature, by engaging one or the other of right and left torque distribution clutches, one or the other of any two elements among three elements of the planetary gear mechanism is locked to the fixed portion, whereby torque can be distributed between the axles of right and left wheels. Also, if the differential limitation clutch is engaged to control the relative rotation of any two elements among three elements of the planetary gear mechanism, the planetary gear mechanism enters a locked state, so that the axles of the right and left wheels are integrated to perform differential limitation. By the arrangement of merely providing the differential limitation clutch, differential limitation can be performed by simple control and moreover the control response is improved, as compared with the case where differential limitation is performed by controlling the engagement forces of the right and left torque distribution clutches.

Further, since the differential limitation clutch is arranged between any two elements among the three elements of the planetary gear mechanism, only a small engagement force is required and thus a small-sized and low-capacity differential limitation clutch can be used, as compared with the case where the differential limitation clutch is arranged directly on the axle.

According to a second feature of the present invention, in addition to the first feature, the differential limitation clutch controls relative rotation of a sun gear and a carrier member of the planetary gear mechanism.

With the arrangement of the second feature, since the differential limitation clutch controls the relative rotation of the sun gear and the carrier member of the planetary gear mechanism, designing the layout of the differential limitation clutch becomes easy and the size of the vehicular driving force distribution system can be reduced, as compared with the case where the relative rotation of a ring gear and the sun gear or the relative rotation of the ring gear and the carrier member is controlled.

The above-mentioned object, other objects, characteristics, and advantages of the present invention will become apparent from preferred embodiments, which will be described in detail below by reference to the attached drawings.

DESCRIPTION OF THE PREFERRED EMBODIMENTS

Figure 1:
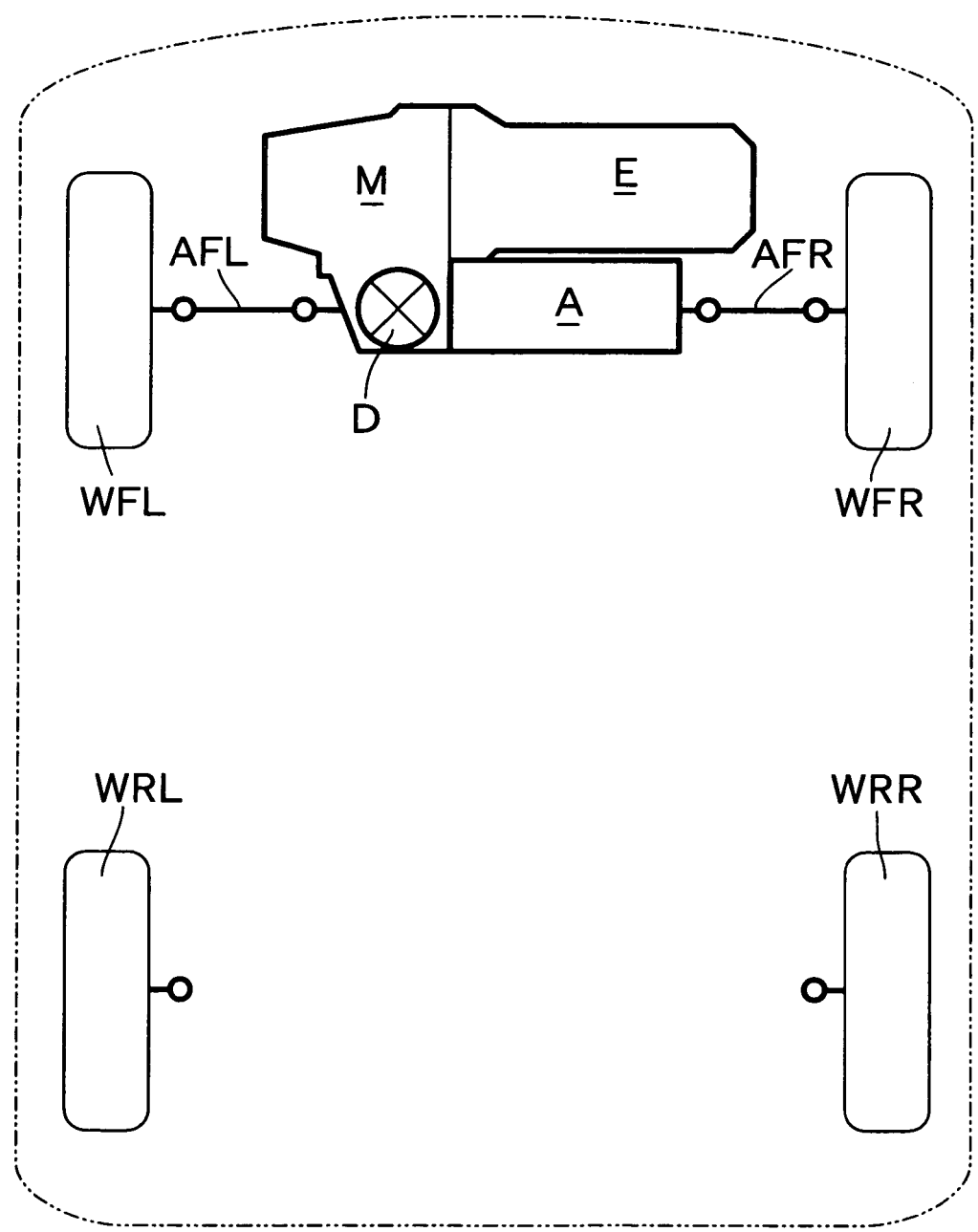
FIG. 1 is a view showing a general configuration of a front-engine front-drive vehicle in accordance with a first embodiment.

As shown in FIG. 1, a front-engine front-drive vehicle includes left and right front wheels WFL and WFR which are driving wheels, and left and right rear wheels WRL and WRR which are follower wheels. A transmission M is connected to the left end of an engine E mounted in the longitudinal direction in a front part of a vehicle body. A torque distribution mechanism A integral with a differential device D is arranged in the rear of the engine E and the transmission M. A left front wheel WFL and a right front wheel WFR are connected respectively to a left axle ARL and a right axle ARR extending leftward and rightward from the left end and right ends of the differential device D and the torque distribution mechanism A.

Figure 2:
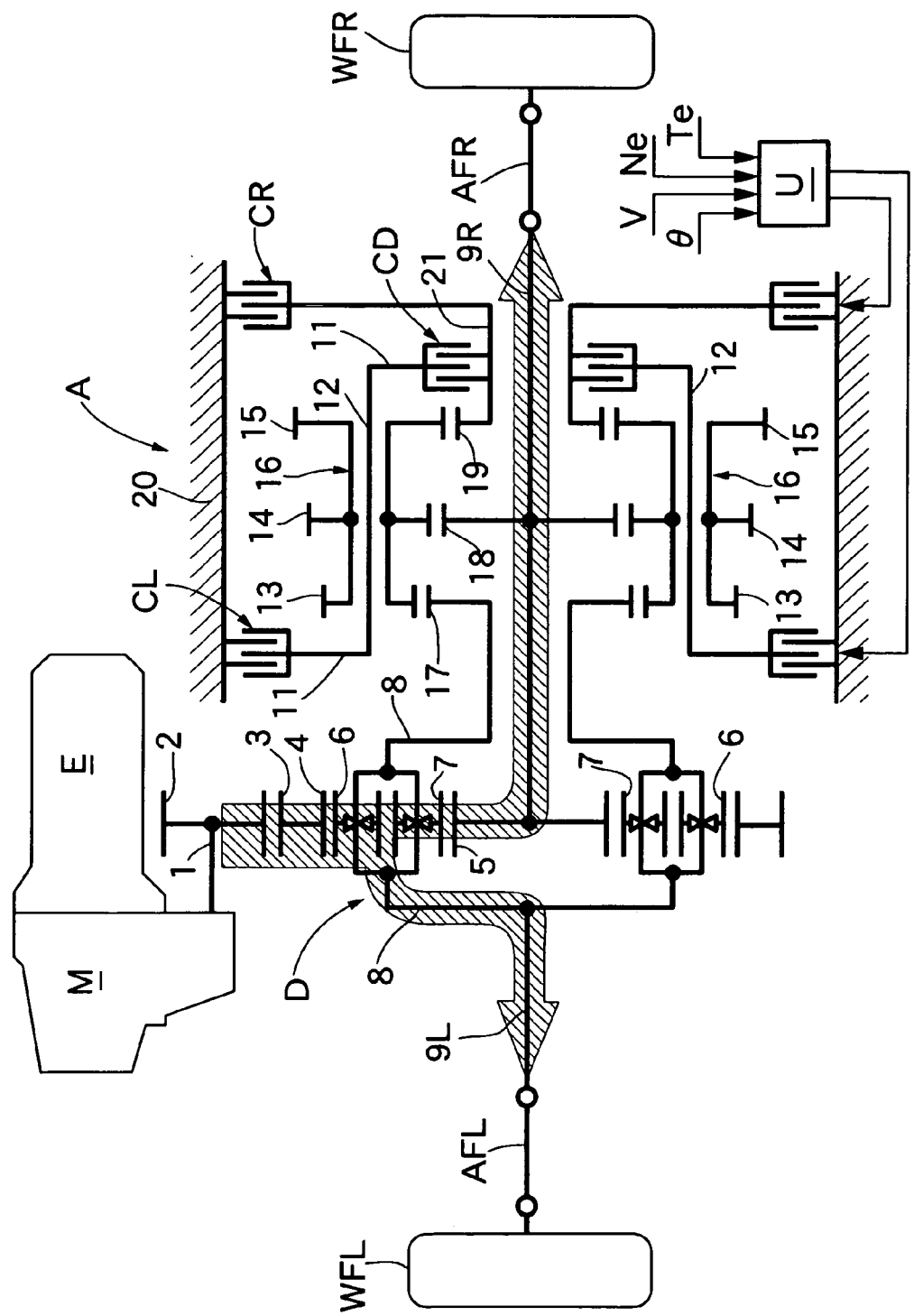
FIG. 2 is a diagram showing a construction of a driving force distribution system.

As shown in FIG. 2, the differential device D is integrally provided on the torque distribution mechanism A. A driving force is transmitted to the differential device D from an outer-tooth gear 3 meshing with an input gear 2 which is provided on an input shaft 1 extending from the transmission M. The differential device D is a planetary gear mechanism of a double pinion type, and comprises: a ring gear 4 formed integrally with the outer-tooth gear 3; a sun gear 5 disposed coaxially within the ring gear 4; and a planetary carrier 8 supporting an outer planetary gear 6 meshing with the ring gear 4 and an inner planetary gear 7 meshing with the sun gear 5 in a state in which they are meshed with each other. In the differential device D, the ring gear 4 functions as an input element, the sun gear 5 functions as one output element and is connected to the right front wheel WFR via a right output shaft 9R and the right axle ARR, and the planetary carrier 8 functions as the other output element and is connected to the left front wheel WFL via a left output shaft 9L and the left axle ARL.

The torque distribution mechanism A for distributing the driving force between the left and right front wheels WFL and WFR comprises a planetary gear mechanism. A carrier member 11 of the torque distribution mechanism A is rotatably supported on the outer periphery of the right output shaft 9R. A triple pinion member 16 integrally forming a first pinion 13, a second pinion 14 and a third pinion 15 which are rotatably supported respectively on four pinion shafts 12 arranged at 90° intervals in the circumferential direction, is also rotatably supported on the outer periphery of the right output shaft 9R.

A first sun gear 17, which is rotatably supported on the outer periphery of the right output shaft 9R to be meshed with the first pinion 13, is connected to the planetary carrier 8 of the differential device D. Also, a second sun gear 18 fixed to the outer periphery of the right output shaft 9R meshes with the second pinion 14. Further, a third sun gear 19 rotatably supported on the outer periphery of the right output shaft 9R meshes with the third pinion 15.

The numbers of teeth of the first pinion 13, the second pinion 14, the third pinion 15, the first sun gear 17, the second sun gear 18, and the third sun gear 19 are as described below.

The number of teeth of the first pinion 13, $Z_b=16$
The number of teeth of the second pinion 14, $Z_d=16$
The number of teeth of the third pinion 15, $Z_f=32$
The number of teeth of the first sun gear 17, $Z_a=30$
The number of teeth of the second sun gear 18, $Z_c=26$
The number of teeth of the third sun gear 19, $Z_e=28$ The third sun gear 19 can be connected to a housing 20 of the torque distribution mechanism A via a sleeve 21 fitting to the outer periphery of the right output shaft 9R and a right clutch CR, and the rotational speed of the carrier member 11 is increased by the engagement of the right clutch CR. Also, the carrier member 11 can be connected to the housing 20 via a left clutch CL, and the rotational speed of the carrier member 11 is decreased by the engagement of the left clutch CL.

Also, a differential limitation clutch CD is disposed between the carrier member 11 of the torque distribution mechanism A and the sleeve 21 of the third sun gear 19. When the differential limitation clutch CD is engaged and the carrier member 11 and the third gear 19 are integrated so as to be incapable of being relatively rotated, the torque distribution mechanism A comprising the planetary gear mechanism is locked.

An electronic control unit U arithmetically processes an engine torque Te, an engine rotational speed Ne, a vehicle speed V and a steering angle θ in accordance with a predetermined program, and controls the operations of the left clutch CL, the right clutch CR, and the differential limitation clutch CD.

Next, the constructions of the differential device D and the torque distribution mechanism A are described in more detail with reference to FIG. 3.

The housing 20 of the differential device D and the torque distribution mechanism A is formed by combining a center housing 32, a left housing 33 and a right housing 34. The differential device D is housed in a left half portion of the center housing 32 and in the left housing 33, and the torque distribution mechanism A is housed in a right half portion of the center housing 32 and in the right housing 34. More specifically, in the center housing 32, a partition wall 32*a* extending toward the outer periphery of the right axle 9R is formed, the differential device D is housed on the left side of the partition wall 32*a*, and the torque distribution mechanism A is housed on the right side of the partition wall 32*a*.

A differential case 36 forming the outer hull of the differential device D comprises a first case 37 and a second case 38 which are connected to each other. The first case 37 is rotatably supported in the left housing 33 via a roller bearing 39. The second case 38 is rotatably supported on the partition wall 32*a* of the center housing 32 via a roller bearing 40. The output of the transmission M is transmitted from the input gear 2 to the differential case 36 of the differential device D via the outer-tooth gear 3.

Figure 3:
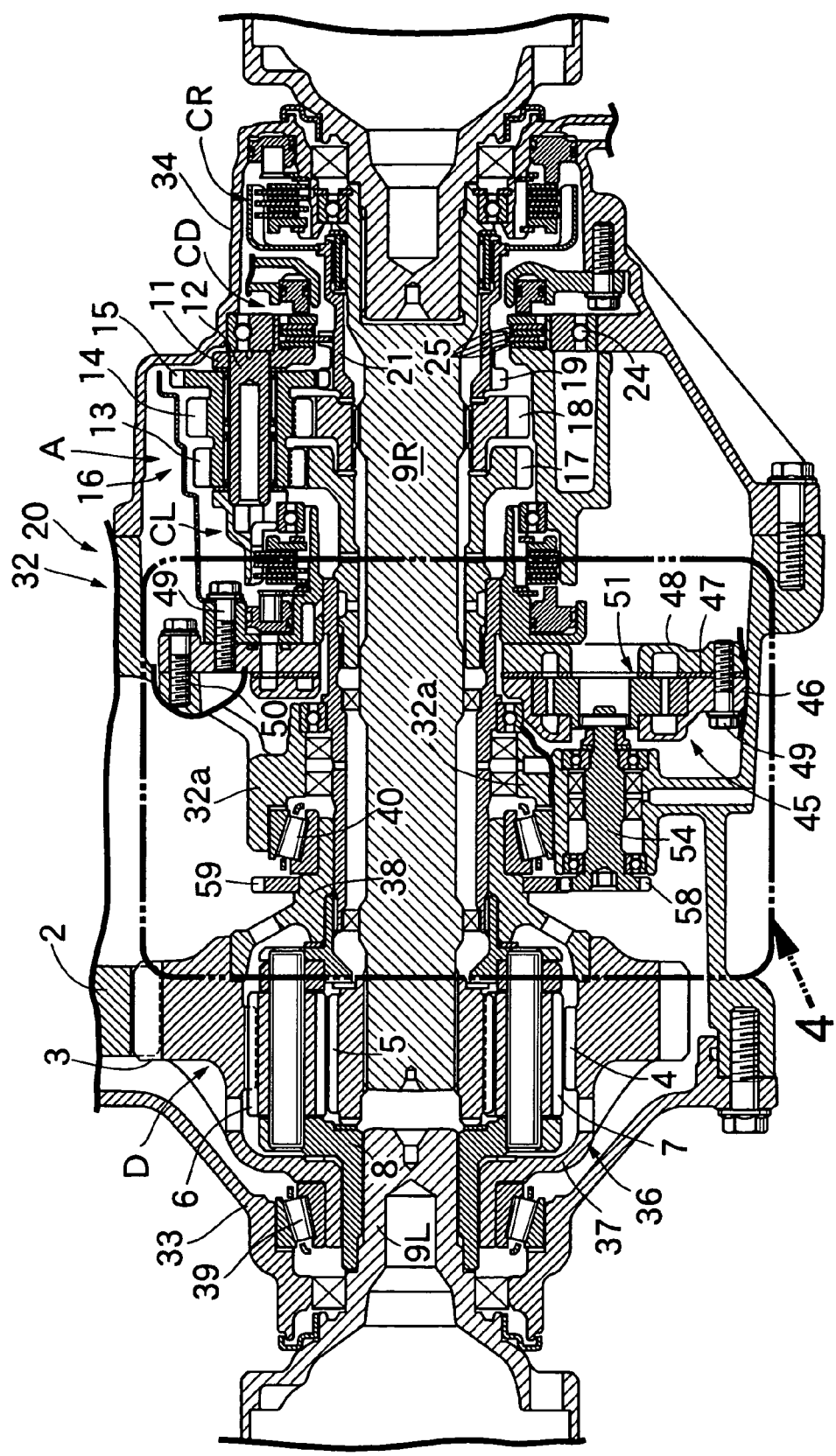
FIG. 3 is a view showing a specific construction of the driving force distribution system.
Figure 4:
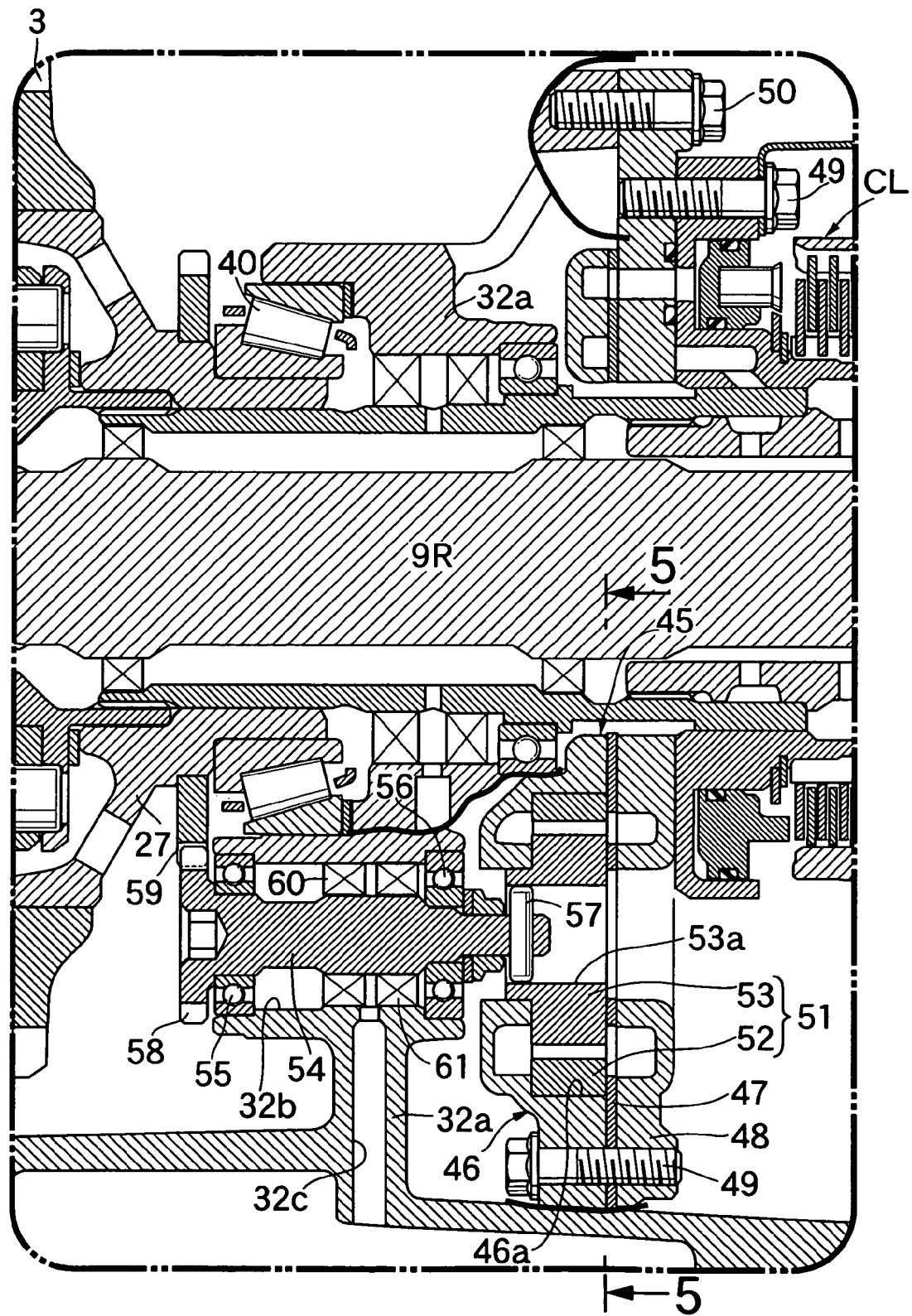
FIG. 4 is an enlarged view of portion 4 in FIG. 3.

As is apparent from FIGS. 3 and 4, a pump unit 45 for supplying working oil to the torque distribution mechanism A is formed by superposing a first pump body 46, a separator plate 47 and a second pump body 48, and integrally connecting them with bolts 49. This pump unit 45 is fixed by bolts 50 on the right side surface of the partition wall 32*a* of the center housing 32.

A trochoid oil pump 51 housed in a pump chamber 46*a* formed in the first pump body 46 comprises an outer rotor 52 and an inner rotor 53 arranged on the inner periphery of the outer rotor 52. A rotating shaft 54 for driving the inner rotor 53 extends to the differential device D side through a through hole 32b in the partition wall 32a. Specifically, the rotating shaft 54 is supported in the through hole 32b formed in the partition wall 32a via a pair of ball bearings 55 and 56. A drive pin 57 is provided at the tip end of the rotating shaft 54 projecting rightward from the partition wall 32a, and engages with a groove 53a formed in the inner rotor 53. A follower gear 58 is provided at the tip end of the rotating shaft 54 projecting leftward from the partition wall 32a, and meshes with a driving gear 59 fixed to the second case 38 of the differential case 36. Therefore, the rotation of the differential case 36 is transmitted to the inner rotor 53 via the driving gear 59, the follower gear 58, the rotating shaft 54 and the drive pin 57, so that the oil pump 51 is operated by the cooperation with the outer rotor 52 rotated by being meshed with the inner rotor 53.

First and second seal members 60 and 61 are provided between the through hole 32b and the intermediate portion of the rotating shaft 54. The first seal member 60 is mounted so as to hinder oil leakage from the differential device D side to the torque distribution mechanism A side. The second seal member 61 is mounted so as to hinder oil leakage from the torque distribution mechanism A side to the differential device D side. A space between the first and second seal members 60 and 61 communicates with the atmosphere via a communication hole 32c formed in the partition wall 32a.

As shown in a right side part of FIG. 3, clutch plates 25 of the differential limitation clutch CD are arranged in a radially inner side of a ball bearing 24 which supports the carrier member 11 of the torque distribution mechanism A in the right housing 34. Therefore, the dimension of the torque distribution mechanism A can be reduced in the axial direction, as compared with the case where the clutch plates 25 are arranged in an axially outer side of the ball bearing 24.

Figure 5:
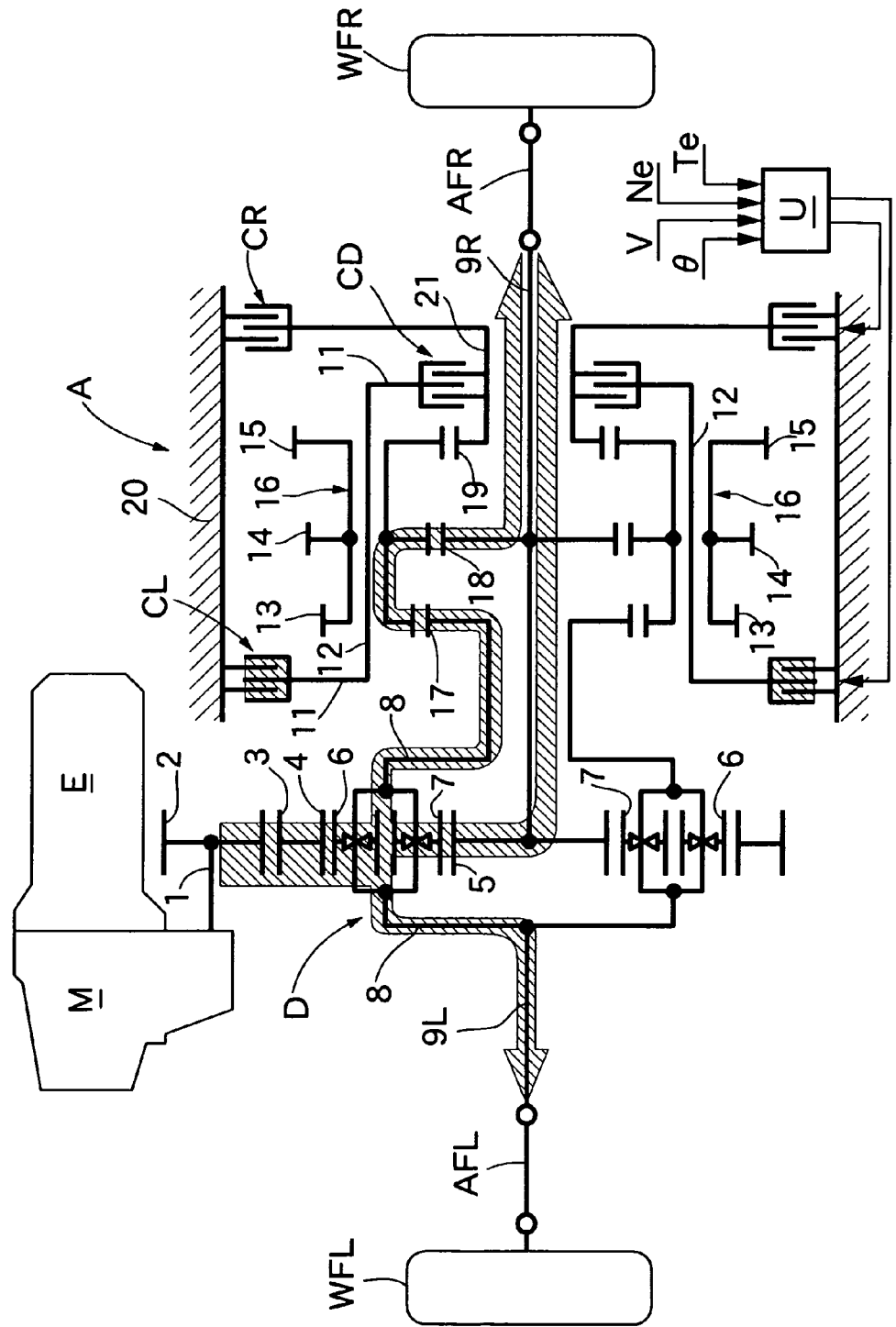
FIG. 5 is a diagram showing an operation of the driving force distribution system at the time of turning left in a medium or low vehicle speed region.

According to the torque distribution mechanism A configured as described above, when the vehicle is turned to the left in the medium or low vehicle speed region as shown in FIG. 5, the left clutch CL is engaged by a command from the electronic control unit U, whereby the carrier member 11 is connected to the housing 20 and hence the rotation is stopped. At this time, since the right output shaft 9R integral with the right front wheel WFR and the left output shaft 9L integral with the left front wheel WFL (namely, the planetary carrier 8 of the differential device D) are connected to each other via the second sun gear 18, the second pinion 14, the first pinion 13 and the first sun gear 17, the rotational speed NR of the right front wheel WFR is increased with respect to the rotational speed NL of the left front wheel WFL, according to the following equation:

$$NR/NL = (Zd/Zc) \times (Za/Zb) \quad (1)$$
$$= 1.154$$

Figure 10:
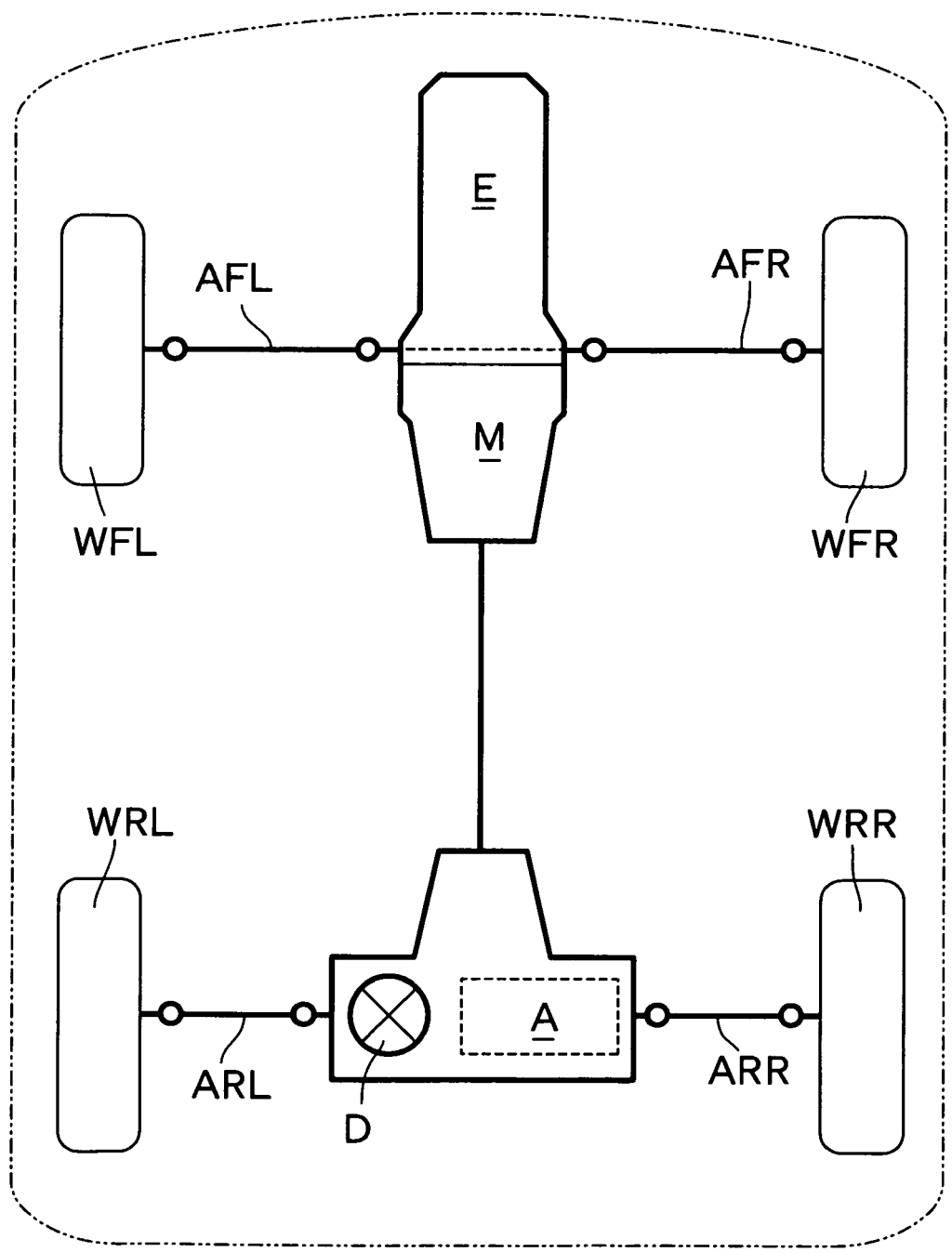
FIG. 10 is a view showing a general configuration of a front engine rear drive vehicle in accordance with a fourth embodiment.

If the rotational speed NR of the right front wheel WFR is increased with respect to the rotational speed NL of the left front wheel WFL as described above, a part of torque of the left front wheel WFL, which is a turning inner wheel, is transmitted to the right front wheel WFR, which is a turning outer wheel, as indicated by the hatched arrow mark in FIG. 10, thereby assisting the left turn of vehicle to improve the turning performance.

If the rotational speed of the carrier member 11 is decreased by appropriately regulating the engagement force of the left clutch CL instead of stopping the carrier member 11 by using the left clutch CL, the rotational speed NR of the right front wheel WFR is increased with respect to the rotational speed NL of the left front wheel WFL corresponding to the decrease in speed, and an arbitrary torque can be transmitted from the left front wheel WFL which is a turning inner wheel to the right front wheel WFR which is a turning outer wheel.

Figure 6:
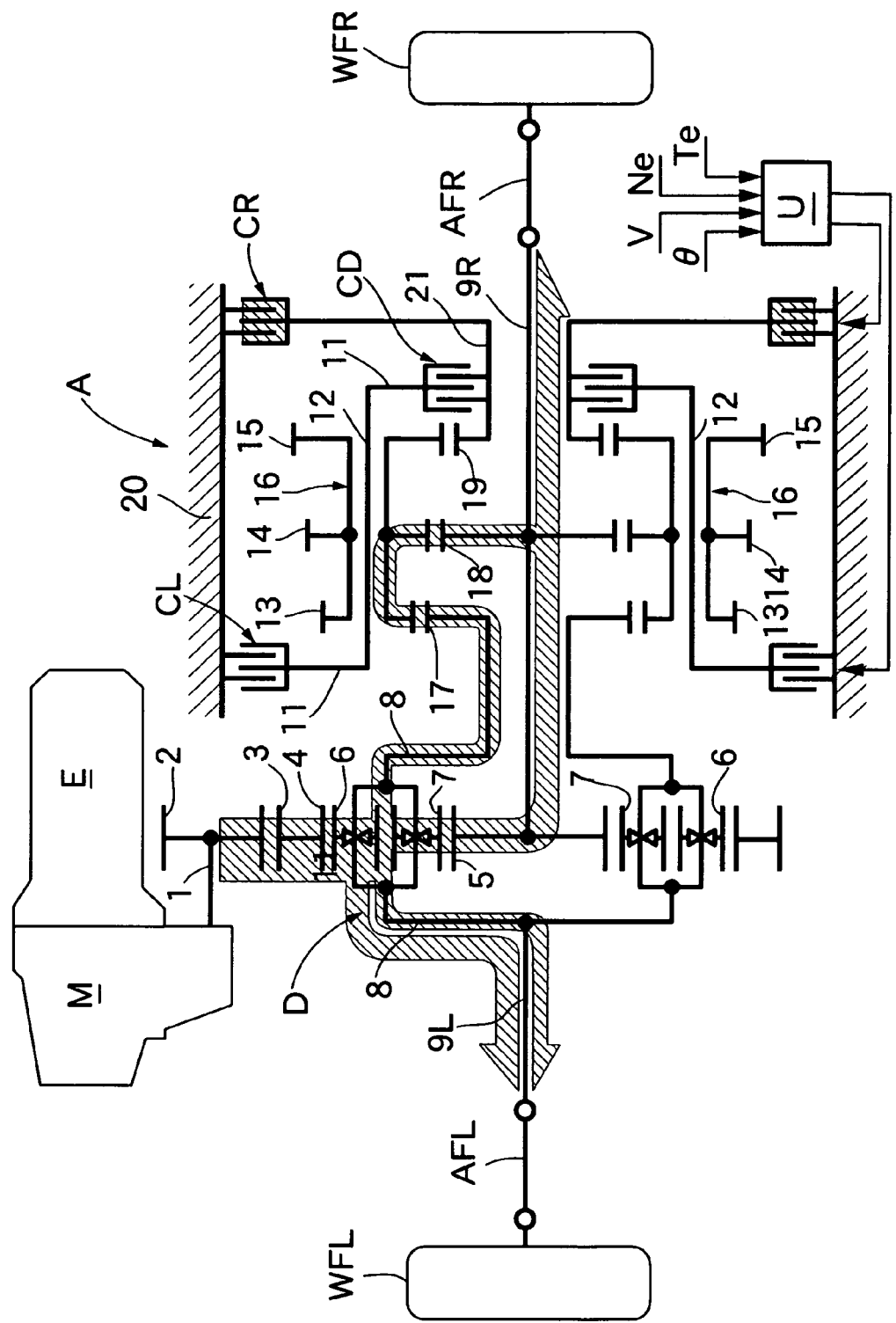
FIG. 6 is a diagram showing an operation of the driving force distribution system at the time of turning right in the medium or low vehicle speed region.

On the other hand, as shown in FIG. 6, when the vehicle is turned to the right in a medium or low vehicle speed region, the sleeve 21 is connected to the housing 20 by engaging the right clutch CR at a command from the electronic control unit U, whereby the rotation is stopped. As a result, the third pinion 15 connected to the sleeve 21 via the third sun gear 19 is revolved and rotated, the rotational speed of the carrier member 11 is increased with respect to the rotational speed of the right output shaft 9R, and the rotational speed NL of the left front wheel WFL is increased with respect to the rotational speed NR of the right front wheel WFR, according to the following equation:

$$NL/NR = \left\{ \frac{1-(Ze/Zf)\times}{(Zb/Za)} \right\} \div \left\{ \frac{1-(Ze/Zf)\times}{(Zd/Zc)} \right\} \quad (2)$$
$$= 1.156$$

Figure 11:
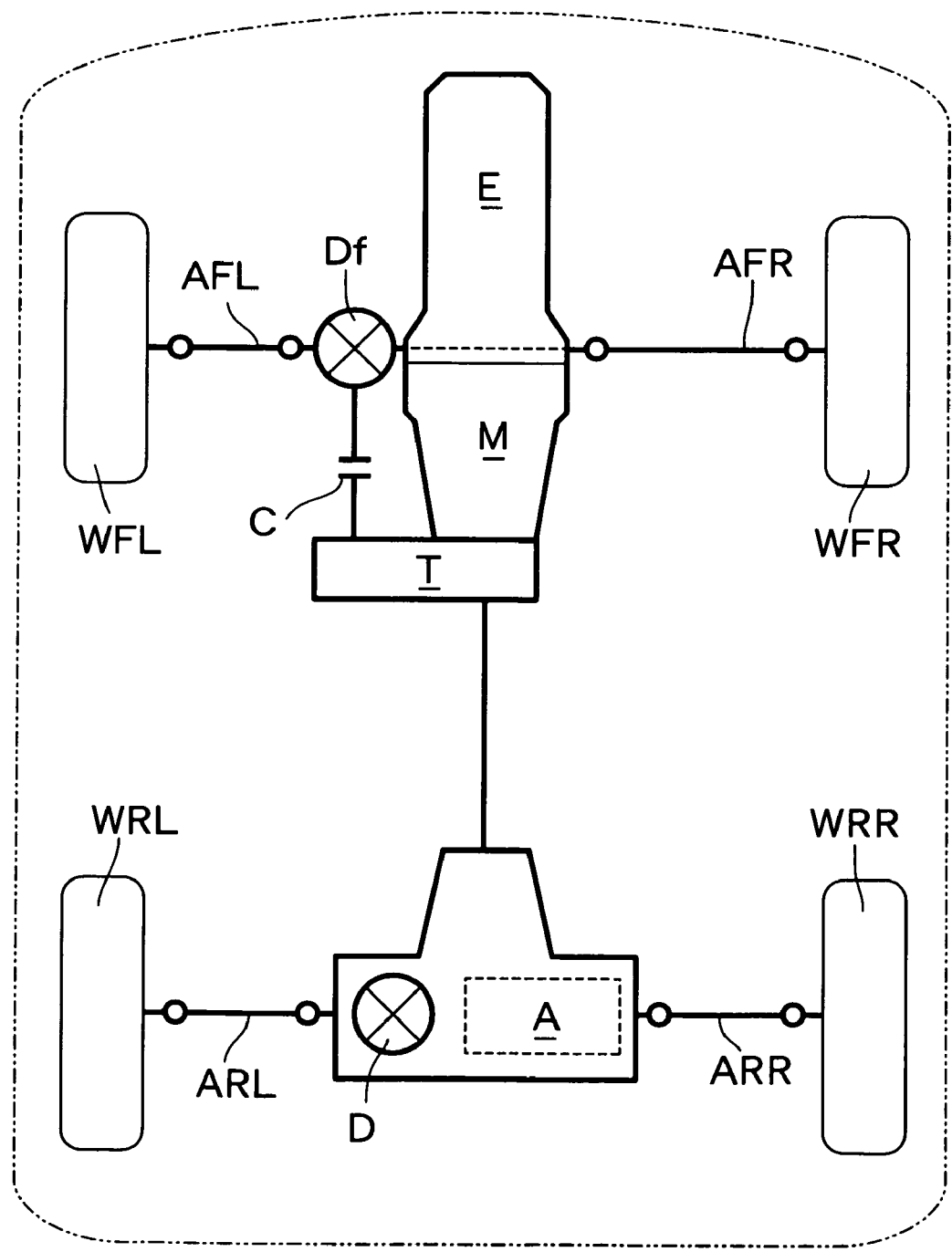
FIG. 11 is a view showing a general configuration of a four wheel drive vehicle in accordance with a fifth embodiment.

If the rotational speed NL of the left front wheel WFL is increased with respect to the rotational speed NR of the right front wheel WFR as described above, a part of torque of the right front wheel WFR, which is a turning inner wheel, can be transmitted to the left front wheel WFL, which is a turning outer wheel, as indicated by the hatched arrow mark in FIG. 11. Also in this case, if the rotational speed of the carrier member 11 is increased by appropriately regulating the engagement force of the right clutch CR, the rotational speed NL of the left front wheel WFL is increased with respect to the rotational speed NR of the right front wheel WFR corresponding to the decrease in speed, and an arbitrary torque is transmitted from the right front wheel WFR which is a turning inner wheel to the left front wheel WFL which is a turning outer wheel, thereby assisting the right turn of vehicle to improve the turning performance.

Also in this case, if the rotational speed of the sleeve 21 is decreased by appropriately regulating the engagement force of the right clutch CR instead of stopping the sleeve 21 by using the right clutch CR, the rotational speed NL of the left front wheel WFL is increased with respect to the rotational speed NR of the right front wheel WFR corresponding to the decrease in speed, and an arbitrary torque can be transmitted from the right front wheel WFR which is a turning inner wheel to the left front wheel WFL which is a turning outer wheel.

As is apparent from the comparison between Equation (1) and Equation (2), by setting the numbers of teeth of the first pinion 13, the second pinion 14, the third pinion 15, the first sun gear 17, the second sun gear 18, and the third sun gear 19 as described above, the speed increasing ratio (about 1.154) from the left front wheel WFL to the right front wheel WFR can be made approximately equal to the speed increasing ratio (about 1.156) from the right front wheel WFR to the left front wheel WFL.

Figure 7:
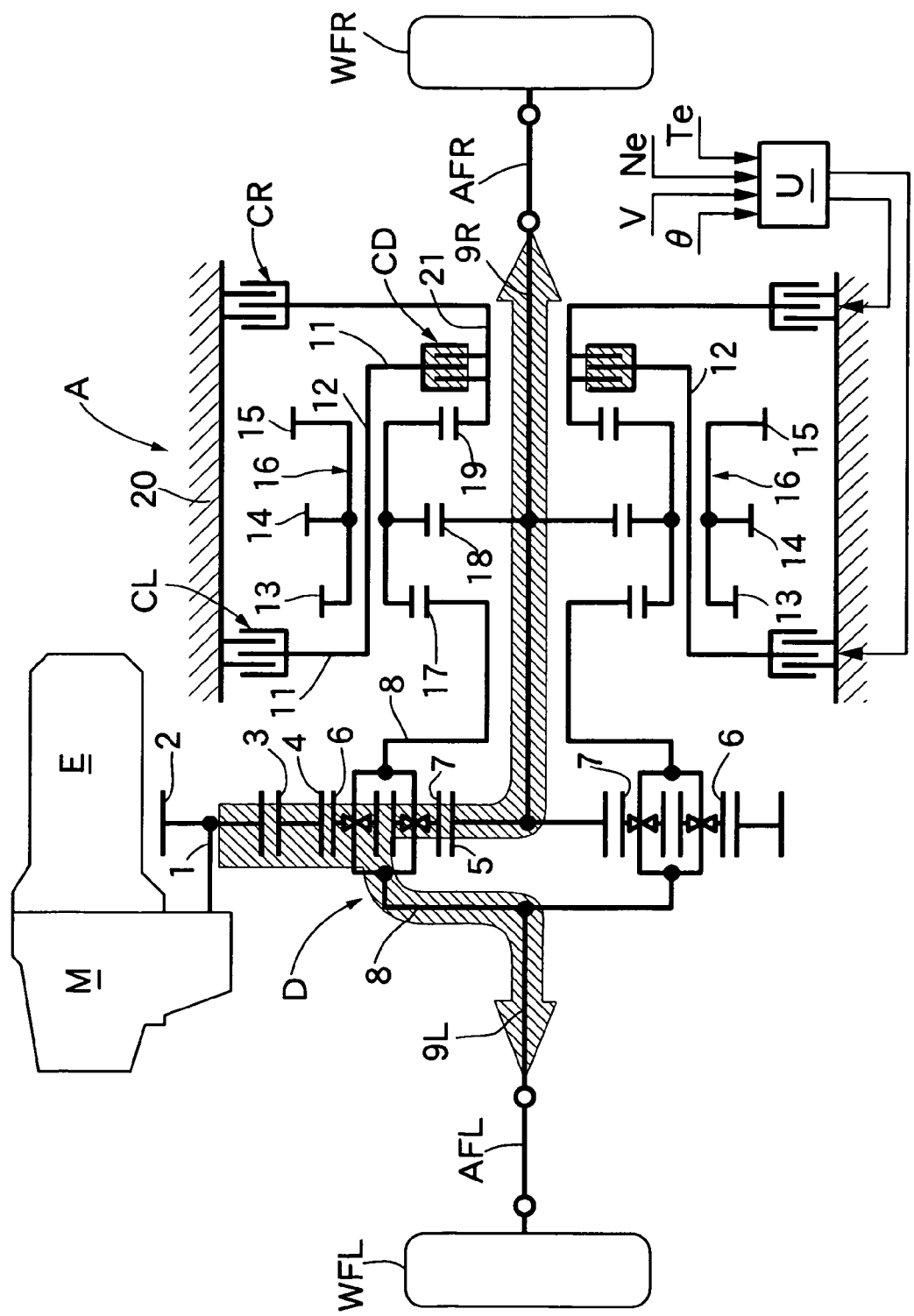
FIG. 7 is a diagram showing an operation of the driving force distribution system at the time of differential limitation.

Also, in the case where the vehicle runs straight at a high speed, it is preferable that the function of the differential device D be limited, and the right and left wheels be rotated substantially integrally. In this case, if the differential limitation clutch CD is engaged by a command from the electronic control unit U as shown in FIG. 7, the carrier member 11 and the third sun gear 19 of the torque distribution mechanism A are connected integrally to each other, so that the planetary gear mechanism enters a locked state. Thus, the left axle ARL connected to the first sun gear 17 and the right axle ARR connected to the second sun gear 18 are integrated so as to be incapable of being relatively rotated, whereby the differential limitation function is exerted.

Even in the straight traveling state with the differential limitation clutch CL being released as shown in FIG. 2 and even in the straight traveling state with the differential limitation clutch CL being engaged as shown in FIG. 7, the same torque is distributed to the left and right front wheels WFL and WFR. If the differential limitation clutch CL is released when the course of vehicle is unsteady, the differential gear D functions to differentiate the rotational speeds of the left and right front wheels WFL and WFR. However, if the differential limitation clutch CL is engaged, the rotational speeds of the left and right front wheels WFL and WFR are kept to be the same, so that the straight traveling stability of vehicle is enhanced.

Even if the left clutch CL and the right clutch CR are engaged in a predetermined slip ratio, the left axle AFL and the right axle AFR are integrated so as to be incapable of being relatively rotated, thereby exerting the differential limitation function. However, it is difficult to control the left clutch CL and the right clutch CR to be engaged in a predetermined slip ratio with a high accuracy, leading to a problem of lowered control response.

In contrast, in this embodiment, the differential limitation function can be exerted merely by engaging the differential limitation clutch CD. Therefore, the control by the electronic control unit U can be easily performed, and also the control response is improved.

In this embodiment, the third sun gear 19 is connected to the carrier member 11 by the differential limitation clutch CD. However, the same operation and effect can be achieved, also when the second sun gear 18 or the first sun gear 17 is connected to the carrier member 11. Further, the same effects can be achieved, also when the differential limitation clutch CD is integrally connected to any two elements among three elements of the planetary gear mechanism, namely, the carrier member, the sun gear and the ring gear. In this embodiment, the third sun gear 19 and the carrier member 11 which are close to each other are connected to each other by the differential limitation clutch CD. Therefore, the torque distribution mechanism A can be downsized, as compared with the case where the ring gear and the carrier member 11, or the ring gear and the sun gear 17, 18, 19 are connected to each other by the differential limitation clutch CD.

Also, since the differential limitation clutch CD is arranged between any two elements among three elements of the planetary gear mechanism, namely the carrier member, the sun gear and the ring gear, only a small engagement force is required, as compared with the case where the differential limitation clutch CD is arranged directly on the left and right axles AFL and AFR. This is because, if the differential limitation clutch CD is arranged directly on the left and right axles AFL and AFR, the ratio between the torque distributed between the left and right axles AFL and AFR and the engagement torque of the differential limitation clutch CD is 1:1; however, if the differential limitation clutch CD is arranged between two elements of the planetary gear mechanism, only a small engagement torque is required by virtue of the action of the planetary gear mechanism.

Therefore, a small-sized and low-capacity differential limitation clutch CD can be used, as compared with the case where the differential limitation clutch CD is arranged directly on the left and right axles AFL and AFR. Also, in the case where the differential limitation clutch CD is used in a slip state without being completely engaged, the required engagement torque of the differential limitation clutch CD is reduced, so that the differential limitation clutch CD can be further downsized.

Figure 8:
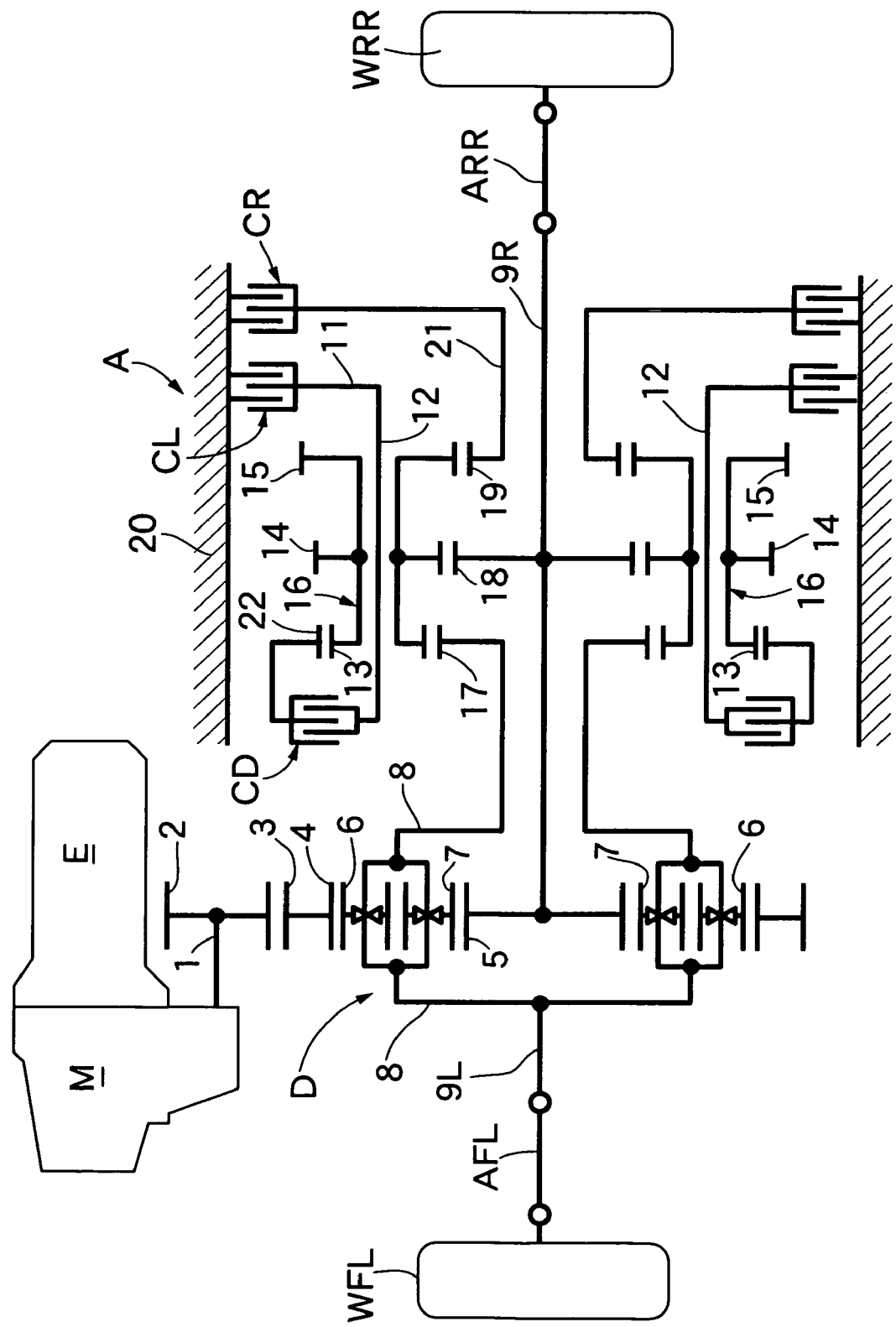
FIG. 8 is a diagram showing a construction of a driving force distribution system in accordance with a second embodiment.

Next, a second embodiment of the present invention is described with reference to FIG. 8.

In the first embodiment shown in FIG. 2, the differential limitation clutch CD connects the third sun gear 19 to the carrier member 11. However, in the second embodiment shown in FIG. 8, the differential limitation clutch CD integrally connects a ring gear 22 meshing with the first pinion 13 and the carrier member 11 to each other to lock the planetary gear mechanism. Even if, instead of the ring gear 22 meshing with the first pinion 13, a ring gear meshing with the second pinion 14 or a ring gear meshing with the third pinion 15 is integrally connected to the carrier member 11, the same operation and effect can be achieved.

Figure 9:
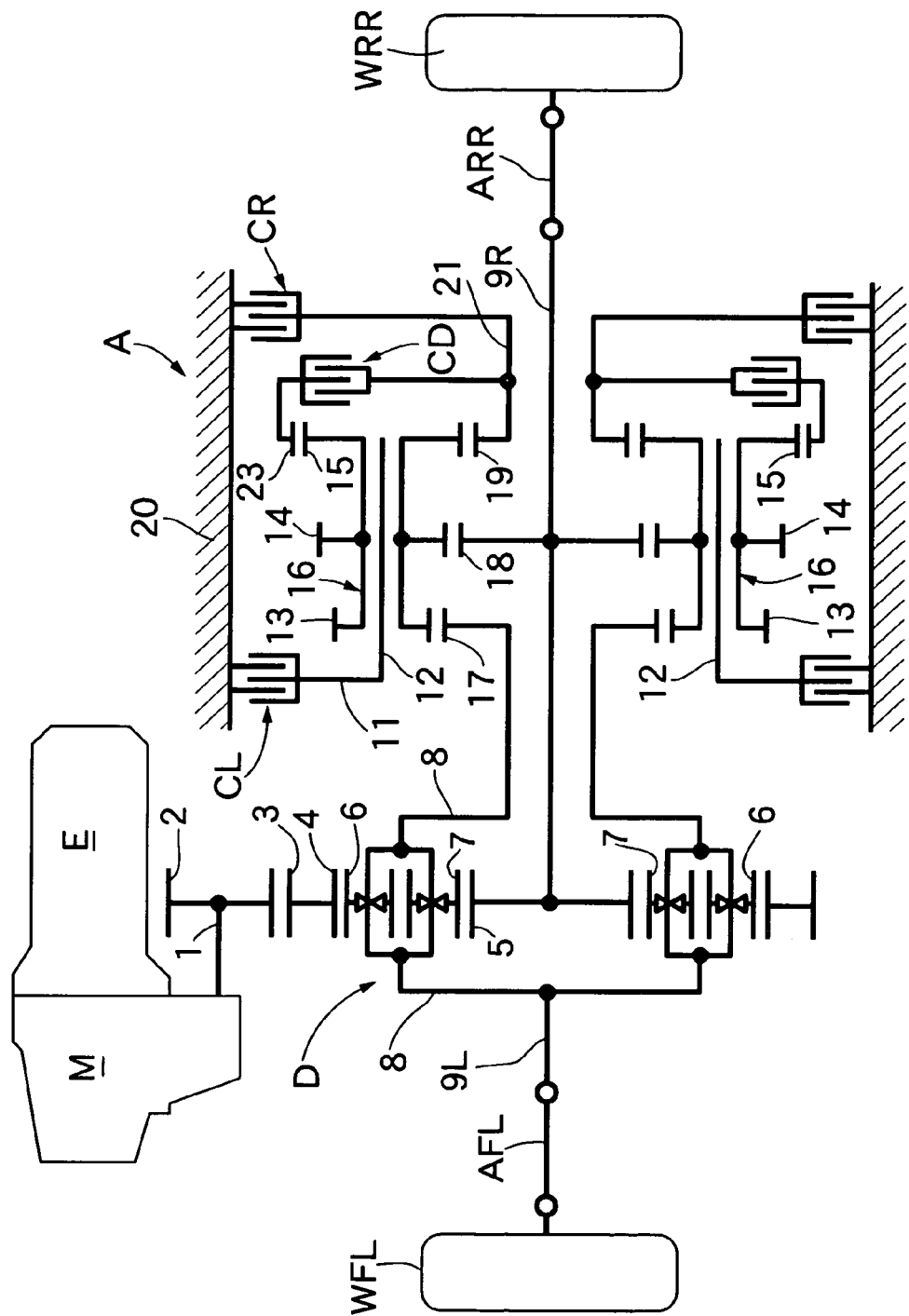
FIG. 9 is a diagram showing a construction of a driving force distribution system in accordance with a third embodiment.

Next, a third embodiment of the present invention is described with reference to FIG. 9.

In the first embodiment shown in FIG. 2, the differential limitation clutch CD connects the third sun gear 19 to the carrier member 11. However, in the third embodiment shown in FIG. 9, the differential limitation clutch CD integrally connects a ring gear 23 meshing with the third pinion 15 and the third sun gear 19 to each other to lock the planetary gear mechanism. Even if, instead of the ring gear 23 meshing with the third pinion 15, a ring gear meshing with the second pinion 14 or a ring gear meshing with the first pinion 13 is integrally connected to the third sun gear 19, the same operation and effect can be achieved.

A fourth embodiment shown in FIG. 10 is a modification of the first embodiment. In the first embodiment, the torque distribution mechanism A is arranged on the front wheel WFL, WFR side of the front-engine front-drive vehicle. However, in the fourth embodiment, the differential gear D and the torque distribution mechanism A are arranged between axles ARL and ARR of the rear wheels WRL and WRR of a front-engine rear-drive vehicle. The construction of the torque distribution mechanism A is the same as that of the first embodiment.

A fifth embodiment shown in FIG. 11 is a modification of the first embodiment. In the first embodiment, the torque distribution mechanism A is arranged on the front wheel WFL, WFR side of the front-engine front-drive vehicle. However, in the fifth embodiment, the differential gear D and the torque distribution mechanism A are arranged between the axles ARL and ARR of the rear wheels WRL and WRR of a four wheel drive vehicle. The construction of the torque distribution mechanism A is the same as that of the first embodiment.

However, a transfer device T connected to a transmission M is connected to the left axle AFL and the right axle AFR of the front wheels WFL and WFR via an electronic control clutch C and a front differential gear Df. Therefore, the vehicle can be brought into a four wheel driving state by engaging the electronic control clutch C, and the vehicle can be brought into a rear wheel driving state by releasing the electronic control clutch C.

The above-described second to fifth embodiments can also achieve the same operation and effect as those of the first embodiment.

The present invention has been described in detail, however, various modifications in design may be made thereto without departing from the subject matter of the invention.

For example, although the left and right clutches CL and CR are connected to two elements, namely the sun gear 19 and the carrier member 11, among the three elements of the planetary gear mechanism of the torque distribution mechanism A in the embodiments, one of the two elements may be the ring gear.

What is claimed is:

1. A vehicular driving force distribution system comprising a torque distribution mechanism which includes a planetary gear mechanism and which is arranged between axles of left and right wheels, any two elements among three elements of the planetary gear mechanism being locked to a fixed portion via torque distribution clutches, respectively, so that torque is distributed between the axles of the left and right wheels, wherein the system further comprises a differential limitation clutch for controlling relative rotation of the two elements among the three elements of the planetary gear mechanism.

2. The vehicular driving force distribution system according to claim 1, wherein the differential limitation clutch controls relative rotation of a sun gear and a carrier member of the planetary gear mechanism.

* * * * *